US012385319B2

(12) United States Patent
Zhou et al.

(10) Patent No.: US 12,385,319 B2
(45) Date of Patent: Aug. 12, 2025

(54) ROLLABLE WALL SYSTEMS

(71) Applicant: A&C Future Inc., Newport Beach, CA (US)

(72) Inventors: Zhuangboyu Zhou, Santa Ana, CA (US); Jiuqi Wang, Tustin, CA (US); Sichen Li, Irvine, CA (US); Keguan Zou, Irvine, CA (US)

(73) Assignee: A&C Future Inc., Irvine, CA (US)

( * ) Notice: Subject to any disclaimer, the term of this patent is extended or adjusted under 35 U.S.C. 154(b) by 0 days.

(21) Appl. No.: 17/706,911

(22) Filed: Mar. 29, 2022

(65) Prior Publication Data

US 2023/0313602 A1 Oct. 5, 2023

(51) Int. Cl.
*E06B 9/17* (2006.01)
*E06B 9/72* (2006.01)

(52) U.S. Cl.
CPC ...... *E06B 9/17007* (2013.01); *E06B 9/17076* (2013.01); *E06B 9/72* (2013.01)

(58) Field of Classification Search
CPC ..... E06B 9/72; E06B 9/17007; E06B 9/17076
See application file for complete search history.

(56) References Cited

U.S. PATENT DOCUMENTS 4,112,996 A * 9/1978 Fohl .......................... E06B 9/84 160/300
4,413,665 A * 11/1983 Corcoran .................. E06B 9/90 160/315
4,519,554 A * 5/1985 Dussoliet .................. E06B 9/82 242/603
5,284,199 A 2/1994 Finch
7,111,661 B2 * 9/2006 Laugenbach ............. E06B 9/86 160/133
8,109,316 B2 * 2/2012 Wang ........................ E06B 9/15 160/232
8,616,261 B2 * 12/2013 Miller ...................... E06B 9/581 160/183
8,746,321 B2 * 6/2014 Miller ........................ E06B 9/15 160/310
8,925,617 B2 * 1/2015 Miller ...................... E06B 9/581 160/183
9,074,411 B2 * 7/2015 Miller ........................ E06B 9/34
9,624,708 B2 * 4/2017 Balay .................... E05D 15/165
9,644,421 B2 * 5/2017 Langkamp ................ E06B 9/58
10,113,360 B2 10/2018 Hall
10,273,750 B2 4/2019 Fleischman
11,131,090 B2 9/2021 Klein (Continued)

*Primary Examiner* — Beth A Stephan
(74) *Attorney, Agent, or Firm* — Joseph A. Andelin; Fish IP Law, LLP

(57) ABSTRACT

A rollable wall system includes a steel frame box, a roll-up wall mechanism, a horizontal self-adaptive rotating shaft, a pair of guiding columns, and two types of locking mechanisms. The roll-up wall mechanism includes several wall segments. There is a hinge between each two neighboring wall segments. The horizontal self-adaption shaft is connected to the uppermost wall segment of the wall mechanism. The rollable wall shaft is mounted in the steel frame box. When the shaft rotates, the wall mechanism will roll up and retract into the box. A locking mechanism is installed between the neighboring wall segments and at the bottom of the wall. The wall segments can be made of multiple interior layers.

19 Claims, 20 Drawing Sheets front view side cross-section view

(56) References Cited

U.S. PATENT DOCUMENTS

| | | | | |
|---|---|---|---|---|
| 11,203,900 | B2 * | 12/2021 | Miller | E06B 9/58 |
| 11,661,792 | B2 * | 5/2023 | Miller | E06B 9/15 160/238 |
| 2010/0126544 | A1 * | 5/2010 | Wagner | E06B 9/74 135/117 |
| 2011/0265959 | A1 * | 11/2011 | Frede | E06B 9/17076 160/133 |
| 2013/0199735 | A1 * | 8/2013 | Colson | E06B 9/80 160/84.02 |
| 2013/0264976 | A1 * | 10/2013 | Lucas | E06B 9/42 318/255 |
| 2014/0224437 | A1 * | 8/2014 | Colson | E06B 9/78 160/311 |
| 2017/0037616 | A1 | 2/2017 | Fleischman | |
| 2018/0305980 | A1 | 10/2018 | Hall | |
| 2020/0208408 | A1 * | 7/2020 | Borsoi | F21V 33/006 |
| 2020/0337921 | A1 * | 10/2020 | Lindqvist | A61G 7/1078 |
| 2021/0388610 | A1 | 12/2021 | Klein | |

* cited by examiner

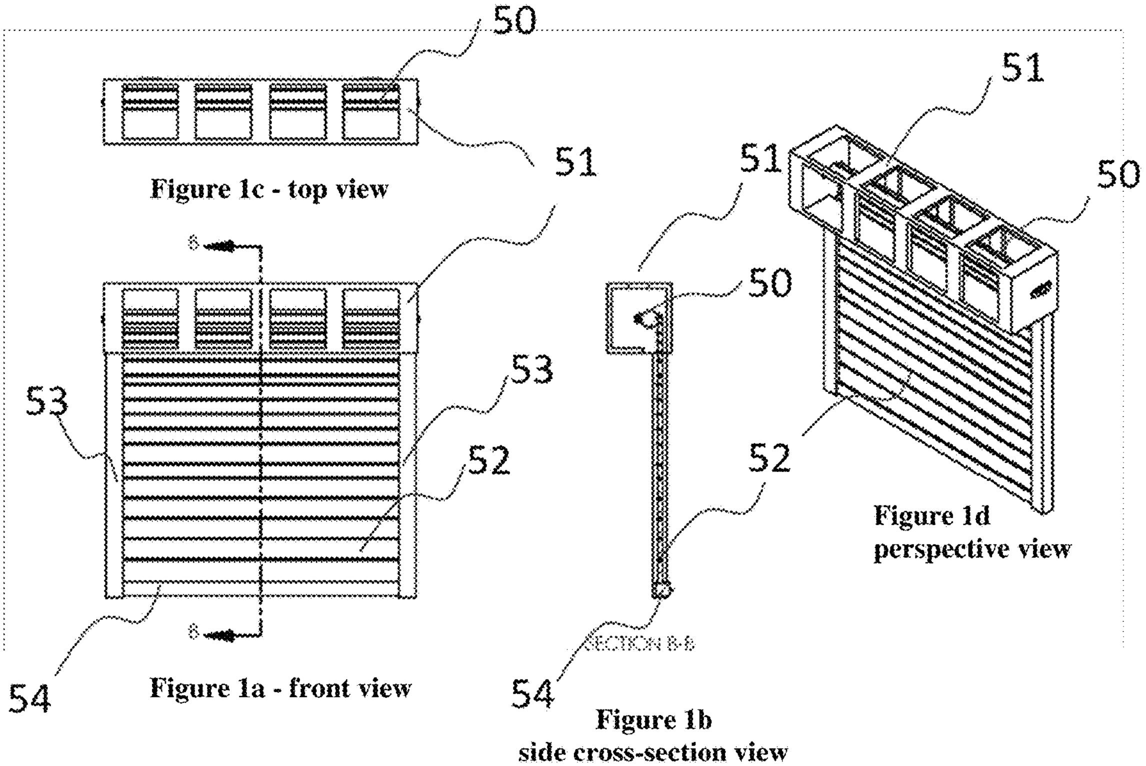
Figure 1c - top view
Figure 1a - front view
Figure 1b
side cross-section view
Figure 1d
perspective view
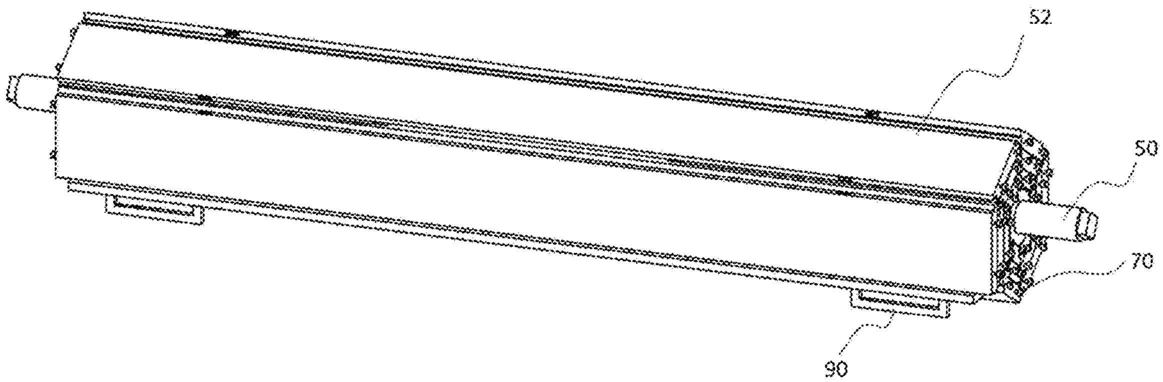
Figure 2.

front view side cross section view side cross section view side cross section view

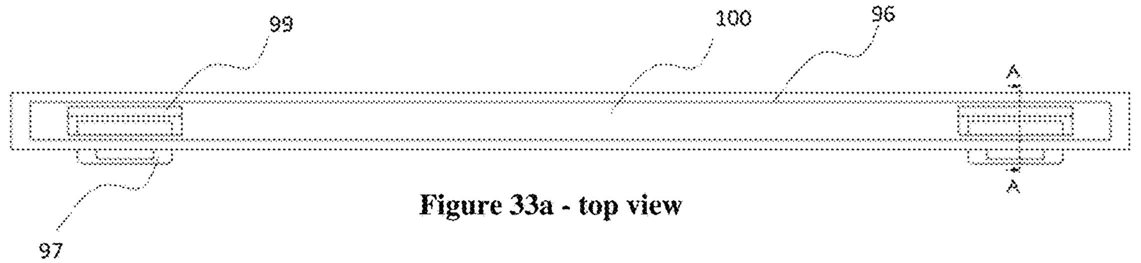
Figure 33a - top view
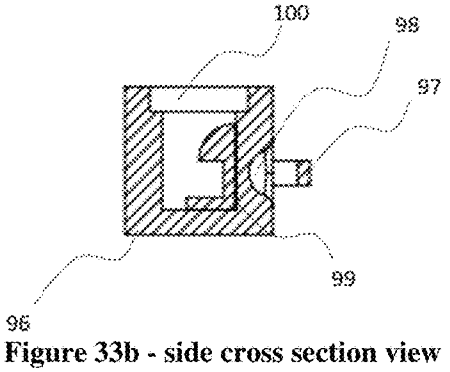
Figure 33b - side cross section view
Section A-A
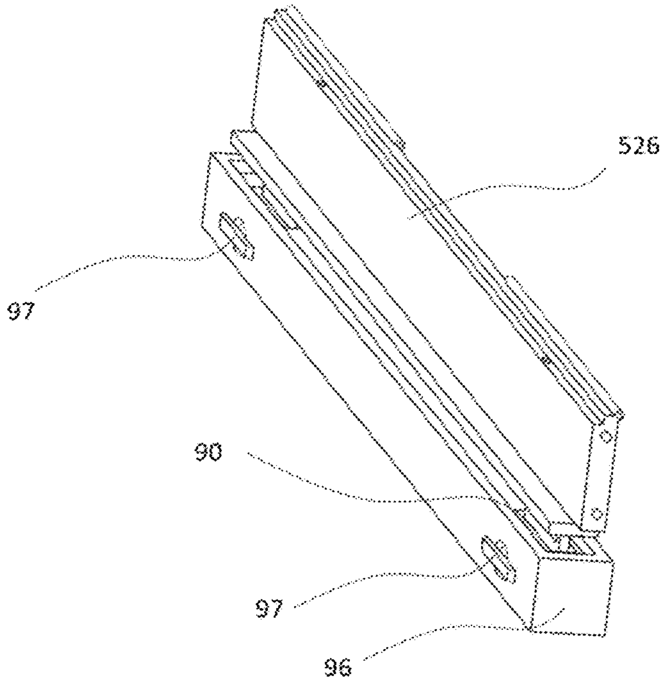
Figure 34.

ROLLABLE WALL SYSTEMS

FIELD OF THE INVENTION

The field of the invention is rollable wall systems for room partition, thermal insulation, and sound insulation. More specifically, the field of the invention is rollable wall systems having multiple wall segments that can roll up with sophisticated mechanical structure.

BACKGROUND

The background description includes information that may be useful in understanding the present invention. It is not an admission that any of the information provided herein is prior art or relevant to the presently claimed invention, or that any publication specifically or implicitly referenced is prior art.

Walls are an integral part of the building. In traditional construction, building walls always takes much time and labor and requires a lot of construction materials to be prepared. Walls are traditionally fixed. Therefore, if one wants to conduct interior space expansion or space division for a traditional building, not only is it costly, but the construction process is often irreversible or difficult to retrace.

Partition walls, as a type of wall, are characterized by the fact that they are not load-bearing, but they are required to achieve sound insulation and reasonable strength. For example, a private room in a restaurant, or a private work area in an office, they are separated by partition wall. If the user feels that the room is too big and wants to divide one room into two, or if there is not enough space and wants to merge two rooms into one, this will be a very complicated process for a traditional partition wall.

The typical way of wall construction is to transport the building materials to the construction site, and then lay and install them by professional workers. In this way, the installation process induces delay brought on by unfavorable weather conditions; building walls on site also causes inefficient usage of materials and produces dust and garbage that harm the environment and human health; walls cannot be constructed before all the supporting structural members and the nearby floors are installed, and this waiting time renders the utilization of manpower inefficient and the whole construction progress delayed; in-situ built walls cannot benefit from mechanization and automatization as do cell phones and computer. Housing is a commodity that is also very complex compared to other commodities such as cell phones and computers, but the production efficiency of a house is significantly lower.

There are now many prefabricated walls that can be manufactured in a factory and can be used and installed directly at the construction site with all the features of a traditional wall. But the obvious disadvantage of such prefabricated walls is the high transportation requirements. The transportation equipment required for the entire wall must be large enough to safely transport it to the construction site.

There are some folding walls in use today that can be used to divide or combine spaces without the hassle of disassembly, and these folding walls have high strength and good sound insulation performance. The disadvantage of these folding partition walls is the complexity of the fabrication and installation process, which makes them too expensive to be popular.

Some partitions use a roll-up structure to facilitate the closing of the body of the partition. For example, garage doors are a common application. This structure moves along a shaft located at a high point to open and close the door. The disadvantage of this structure is that the material of the body is too thin, and the wall can be shaken by external forces, which can lead to safety hazards when installed in indoor offices or residential rooms. Moreover, this structure only divides the space and does not have any other function such as sound insulation.

Thus, it is desirable to provide a wall system that includes the following advantages: quick to manufacture; easy to install; quick to disassemble; high strength; low cost; easy to transport and good sound insulation. This special wall structure can make up for the shortcomings of existing partition walls and will represent a positive contribution to the construction industry.

Thus, there remains a need for improved rollable wall systems and their methods of use.

SUMMARY OF THE INVENTION

The inventive subject matter provides apparatus, systems, and methods in which a rollable wall system transitions between an expanded state (e.g., deployed, unrolled, unwound, extended) and a retracted state (e.g., collapsed, rolled up, wound up). The rollable wall system comprises a first side column (e.g., left side column) having a first guiding rail and a second side column (e.g., right side column) having a second guiding rail, and a plurality of hingeably connected segments slidably disposed in the first rail and second rail. A rotatable shaft is hingeably connected with an uppermost hingeably connected segment so that the plurality of hingeably connected segments wind around, and unwind from, the shaft.

The inventive subject matter further provides apparatus, systems, and methods in which a rollable wall system comprises a rotatable polygonal shaft and a plurality of wall segments that are hingeably connected with one another and with the rotatable polygonal polygonal shaft. When the shaft is rotated in one direction, the plurality of hingeably connected wall segments wrap around, and roll onto, the polygonal shaft. When the shaft is rotated in the opposite direction, the plurality of hingeably connected wall segments unwind from, and unroll off of, the polygonal shaft. The wall segments are sized and dimensioned to tightly contact the surface of the shaft and subsequent outer windings around the shaft. For example, the plurality of wall segments can include: (i) a first subset of wall segments that form a first winding around the rotatable polygonal shaft when in the retracted state, and (ii) a second subset of wall segments that form a second winding around the first subset of wall segments when in the retracted state; wherein the first subset of wall segments each have a first height that is configured to be in tight contact with a surface of the rotatable polygonal shaft when in the retracted state; and wherein the second subset of wall segments each have a second height that is configured to be in tight contact with a surface of the first winding when in the retracted state. As used herein, "height" of a wall segment or partition segment means the dimension that extends between the two hinging edges of the segment.

The inventive subject matter further provides apparatus, systems, and methods in which a rollable wall system comprises a plurality of hingeably connected wall segments, a rotatable shaft hingeably connected with the uppermost wall segment, and wherein each wall segment has an edge that is sized and dimensioned to interlock with an edge of a neighboring wall segment when the rollable wall system is in the expanded state.

According to the inventive subject matter described herein, the above-mentioned problems associated with typical wall construction are overcome by the provision of a rollable wall system. The present invention is a rollable wall system composed of a pair of columns with guiding rails, a rotating shaft to wind the wall around, an optional box for containing and supporting the rotating shaft, locking assemblies at bottom of the wall, and the segmented wall. In the vertical direction, the wall is separated into a number of rigid segments hinged together to form a roller shutter. The wall hung from a horizontal rotating shaft in an optional containing box or another alternative structural member supporting it. This rotating shaft can be driven by a rolling motor and can be rotated to wind the wall to save space and make the wall transportable. The rollable wall can be composed of multiple layers with various functionalities, including soundproofing layer, fire resistance layer, waterproofing layer, and structural layer.

As can be appreciated, deployment of this rollable wall system costs much less time, labor, and effort than does that of a traditional building wall. The rollable wall system saves much space to store after it is collapsed, which is movable, and easy to transport as well. When the rollable wall system is deployed, a rolling motor is mounted to the rotating shaft to wind the wall segments around itself. This rolling motor is detachable and can be dismounted if the rollable wall system does not need to be collapsed in the future. Therefore, when it will not be rolled up very frequently, the rollable wall does not need a permanent rolling motor, and the rolling motor can be rented or be used elsewhere after the rollable wall is deployed, saving additional money and space.

The rollable wall system can be mass-produced in factory and its manufacturing process can be automatized, which can significantly reduce the production cost and increase production efficiency and capacity. Moreover, because the rollable wall system is not made on construction site, it is not affected by adverse weather and thus can provide an important alternative option against adverse weather and facilitate the construction progress, which also brings economic benefits.

Many existing prefabricated walls that are manufactured in factory cannot be collapsed and their sizes are severely limited by available truck size. The present invention provides a solution to this problem. The rollable wall system can be easily collapsed to save space for storage and transportation, making it more possible to transport larger-size walls. The rollable wall system also reduces the need for large and expensive cranes on-site because of its collapsed size.

The rollable wall system has many notable features that distinguish it from other collapsible walls in use nowadays. The rollable wall system is less complex to fabricate, of better airtightness and structural robustness because of its locking and sealing mechanism, and is easier to install and uninstall.

The present inventive subject matter can apply in mobile and folding houses or RVs. In mobile living facilities, there is often a requirement for easy collapsing, easy management of internal space, and maximum space utilization. The collapsible and space-saving feature of the present invention determines that it can meet the above requirements.

Compared to other roll-up structures like a garage door, the rollable wall system has a thicker wall, stronger out-of-plane bending strength, better airtightness, watertightness, sound insulation, and thermal insulation. The rollable wall system provides a wall that meets the serviceability requirements and makes people comfortable living around it, while other roll-up structures like garage door cannot provide such residing experience. In some embodiments, the wall has a thickness of at least 2 inches, a height of at least 8.5 feet, and a rolled-up diameter of 18 inches or less.

OBJECT OF THE INVENTION

Accordingly, it is an object of the present invention to provide a rollable wall system having a regular structure for which manufacturers can achieve mass production at the factory.

It is a further object of the present invention to provide an improved collapsible wall system that is manufactured at low costs.

It is another object of the present invention to provide a rollable wall system that can roll up and down to make retraction and extension convenient.

It is still another object of the present invention to provide a rollable wall system that has good sound insulation performance.

It is yet another object of the present invention to provide a rollable wall system that has strong structural robustness and impact resistance performance.

It is again another object of the present invention to provide a rollable wall system that occupies relatively little space for easy transportation.

It is still a further object of the present invention to provide a rollable wall system that has varied sizes of wall segments to achieve rolling up and down.

It is yet a further object of the present invention to provide a rollable wall system to roll up or down around a polygonal shaft for saving space.

It is again another object of the present invention to provide a rollable wall system with every two neighbor wall segments hinged to ensure that they can rotate.

It is again a further object of the present invention to provide a rollable wall system that has a spring damping system to allow the polygonal rotating shaft to move horizontally in the steel frame box or an alternative supporting structure to ensure the wall rolls up and down vertically.

It is again a further object of the present invention to provide a rollable wall system with every two neighboring wall segments interlockable to prevent shaking caused by external impact.

It is again a further object of the present invention to provide a rollable wall system which can have all the wall segments locked with one knob.

It is an additional object of the present invention to provide a rollable wall system that can have a container with steel frame installed on the ceiling or an alternative supporting structure, which bears the load of wall segments during rolling.

It is again another object of the present invention to provide a rollable wall system that has two vertical steel columns to support the steel frame box or an alternative supporting structure and the wall body.

It is still an additional object of the present invention to provide a rollable wall system with two assistant points on each side of each wall segment to ensure that each wall segment slides down or up along the guiding rails of the two columns.

It is yet an additional object of the present invention to provide a rollable wall system which can roll down step by step with a ratchet-pawl mechanism to prevent rolling down too fast.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1*a* is front view, FIG. 1*b* is a side cross-section view, FIG. 1*c* top view, and FIG. 1*d* is a perspective view of a rollable wall system.

FIG. 2 is a perspective view of the rotatable shaft and rollable wall segments of the rollable wall system of FIG. 1 in a retracted state (e.g., rolled up).

FIG. 33*a* is a top view of the bottom double locking mechanism of FIG. 32.

FIG. 33*b* is a side cross section view of the bottom double locking mechanism of FIG. 32.

FIG. 34 is a perspective view of the bottom double locking mechanism and lowermost wall segment of the rollable wall system of FIG. 1 in an unlocked state.

DETAILED DESCRIPTION OF THE INVENTION

Figure 3:
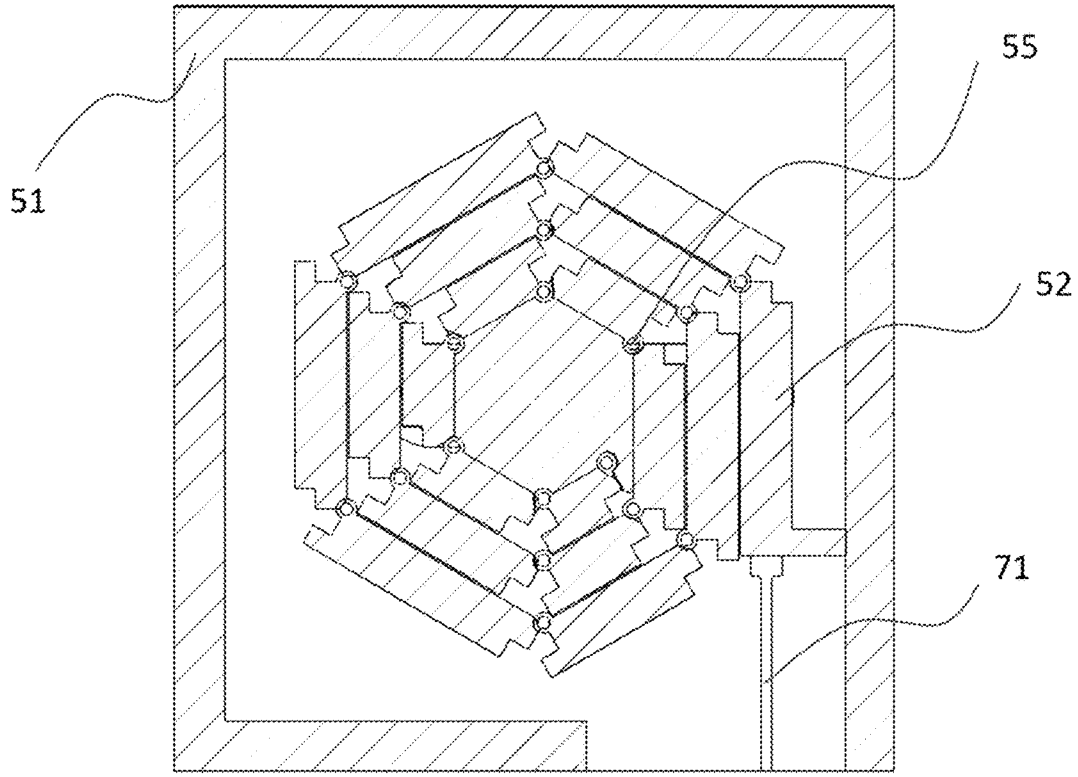
FIG. 3 is a side cross-section view of the rollable wall system of FIG. 1 in the retracted state.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

FIGS. 1*a*, 1*b*, 1*c*, and 1*d* show the overall structure of a rollable wall system, which includes a polygonal rotating shaft 50, an optional steel frame box 51, a wall 52 consisting of several wall segments, a pair of supporting columns 53 on the two sides of the wall, and a bottom locking and sealing mechanism 54. Because the present invention is expandable and collapsible, with associated mechanics, its form changes all the time as the shaft rotates. FIG. 1 shows the present invention in its fully expanded state. In this state, the present invention can achieve all the functions we expect it can achieve, such as not deforming under a certain range of internal and external forces, high strength, windproof, soundproof, and can be used to partition and merge two rooms or spaces. To roll up or down the wall, the shaft can be driven by a high-power stepper motor or manually. Both control methods can achieve a gradual and stable rolling process, thus increasing the lifespan of the device and reducing safety risks.

The steel frame box 51 is optional and can be replaced by any box, or beam, or other structure that can provide adequate support for the polygonal rotation shaft 50 and the retracted wall segments. A steel frame box is composed of the steel members of hollow structural sections and steel plates, which are welded together. The steel frame box 51 or its replacement can be mounted on top of the pair of support columns 53 with guiding rails using high strength bolting connections. The steel framed box 51 or its replacement can serve as a structural beam with solid robustness. An external rolling motor can be mounted on a side of the box and bound to the polygonal rotation shaft 50. If the steel framed box 51 is used, it can serve as a container during transportation of the rollable wall.

When the rollable wall system is in the fully expanded state, the bottom of the wall will be incorporated with the bottom double locking and sealing mechanism. A sealing cover is attached to the bottom of the lowermost wall segment to prevent liquids and dust from entering the locking core, thus protecting the locking mechanism from external corrosion. By plugging the bottom of the wall into the groove of the locking and sealing mechanism 54, the bottom of the wall will automatically be locked with no need of additional operation. When the bottom is locked, the locking mechanism between neighboring wall segments can be engaged in the locked state, thus securing the entire wall, and providing adequate impact resistance ability.

FIG. 2 is a perspective view of the rotating shaft 50 and wall segments, showing the state of the wall retracted wound around the polygonal shaft 50. Each wall segment has two assist points 70 on each side. The lowermost wall segment 52 has two rectangular pull rings 90 for locking and engaging the bottom double locking mechanism and sealing mechanism 54 at the bottom of the wall. The neighboring wall segments are connected by special hinges 55 so that the wall can be retracted around its shaft 50. The hinge connection is set on the inner side of the wall segment, so that the wall can be rolled up in one direction and only while in the unlocked state, without deformation in the other direction, which greatly simplifies the locking mechanism between two neighboring wall segments. A rolling motor can be mounted to the polygonal shaft 50 when the rollable wall needs to be deployed and extended and can be demounted when the rollable wall does not need to be rolled up and collapsed in the near future.

FIG. 3 is a side cross section view of the rollable wall system in the collapsed state (e.g., rolled up, wound up). In this state, the cross-sectional view of the whole device is approximately a polygon, and all the figures herein are illustrated with a hexagonal shape as an example. The actual design of the device can have fewer sides or more sides. The wall is segmented in the vertical direction by hinged joints and there are different heights for the segments of the wall. The height of each segment is designed so that the surface of each wall segment is in tight contact with the surface of the inner layer of wall segments that have been wound around the rotation shaft 50. The heights of the wall segments are adapted so that each innermost wall segment can be in tight contact with the surface of the rotation shaft 50 and not collide with the box 51, if there is a box 51, which contains the collapsed wall segments so that they can be safely stored. As such, if the wall thickness changes, the height of each wall segment also needs to be changed. The design of the rollable wall system can effectively solve problems in storage, transportation, and implementation of thick partition or exterior walls. In addition, the rollable wall system is easy to set up, extend, and retract, effectively reducing the labor and required material resources for building houses.

On the inner side of the steel frame box 51, guiding rails 71 in the box are provided to guide and limit the movement of the wall. The guiding rail constrains the support points on the wall segments so that each wall segment must move along the guiding rail as each wall segment is unrolled off of rotating shaft 50. This rail restriction is intended to allow the wall to always move in the vertical direction as it expands, because without such a restriction, the wall would be at an acute angle to the vertical direction as it unfolds, and this angle would gradually decrease in the process before eventually converging to zero indefinitely when the wall is fully expanded. Compare FIGS. 30*c* and 30*d*. Therefore, this orbital constraint makes the wall more stable in form during motion.

Figure 4:
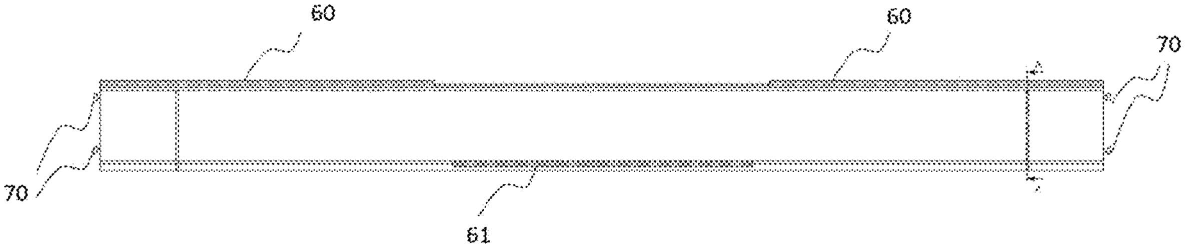
FIG. 4 is a front view of a single wall segment of the rollable wall system of FIG. 1.

FIG. 4 is a front view of a single wall segment. Except for the lowermost wall segment, all the other wall segments are similar to this wall segment, except for the difference in height in the vertical direction. Every two neighboring wall segments are connected by hinges, so that the top and low end of the wall segment are part of the hinge. The top end of the wall segment is the lower joint 60 of the hinge and the lower end of the wall segment is the upper joint 61 of the hinge. In the present invention, there can be several hinges between every two neighboring wall segments, and each hinge can have several joints. Hidden hinges can be used so that both sides of the wall will look flat.

Figure 5:
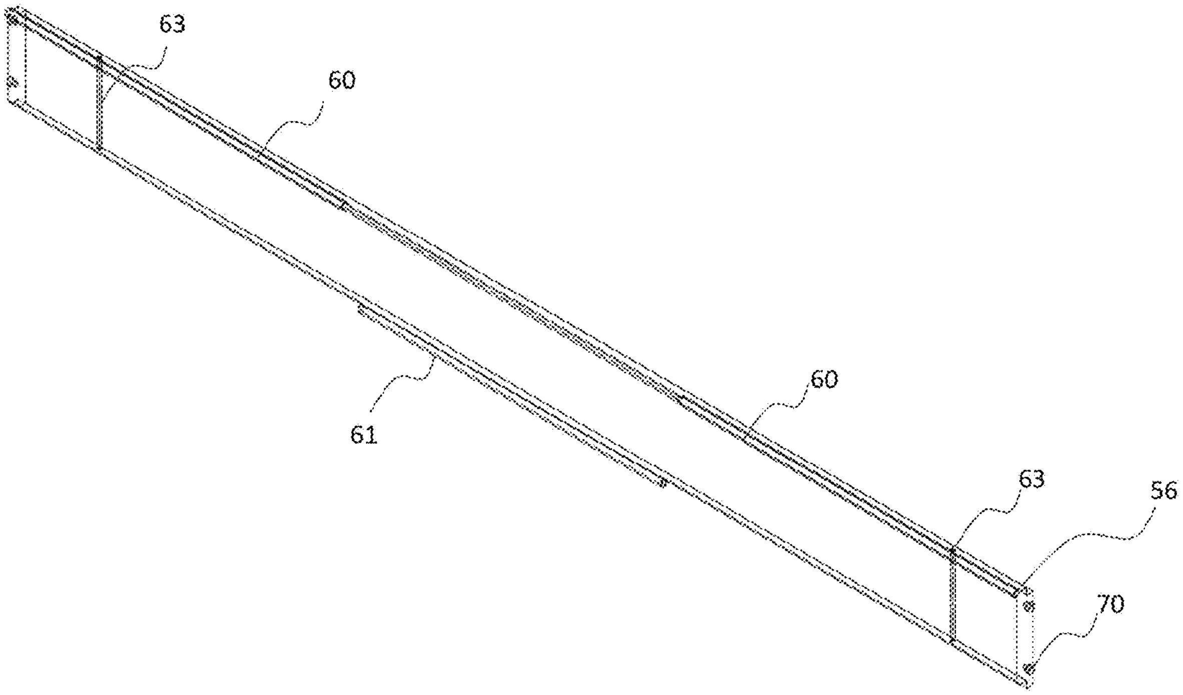
FIG. 5 is a perspective view of the single wall segment of FIG. 4.

FIG. 5 is a perspective view of a single wall segment. The obvious structure on the wall segment is a tab structure in addition to the hinges and assistant points. The tab structure is designed to allow the wall segment to rotate relatively to its neighboring wall segments and to achieve a seal and uniformity of force when assembled. The form of the tab is not limited to the shape shown in FIG. 5, but can be rounded edges, multiple angles, etc. The shape of the tab can be determined according to the number of polygonal sides of the interface when the wall is retracted or the actual ambient environment.

Figure 6:
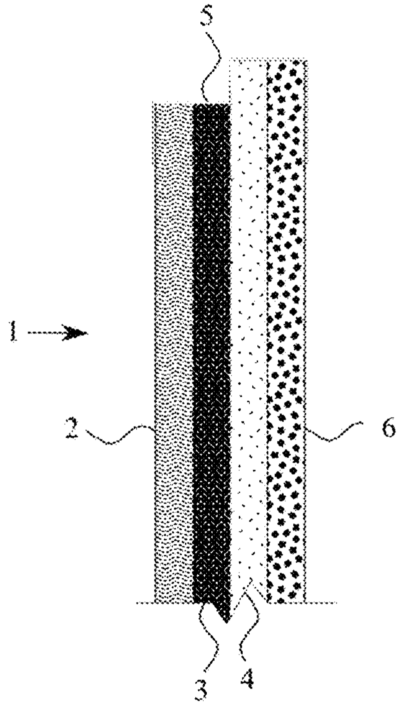
FIG. 6 is a side cross-section view of the single wall segment of FIG. 4 showing the interior layers.

FIG. 6 is a side cross section view of the interior layers of a wall segment. Each segment of wall can be made of multiple layers of different functionalities. FIG. 6 shows an example, which includes an exterior fireproof layer 2, such as ½ inch Firecode C Core gypsum panel, a basalt fiber fabric layer 3, a soundproofing or sound-absorbing layer 4, like a wall mate stretch wall system, and a waterproof breathable layer 6. The wall segment also has a metal plate layer 5 disposed along a top edge 56 of the wall segment for strength. A bonding agent is used which achieves low volatile organic compound emissions while offers a good bonding solution for the sandwich structure. Perimeter steel channels of 22 gauge (0.0295 inch) thick adapted to shape of wall segment edge will be fastened around the edge. In this example, the total thickness of the wall can be 2 inches to 5 inches.

Figure 7:
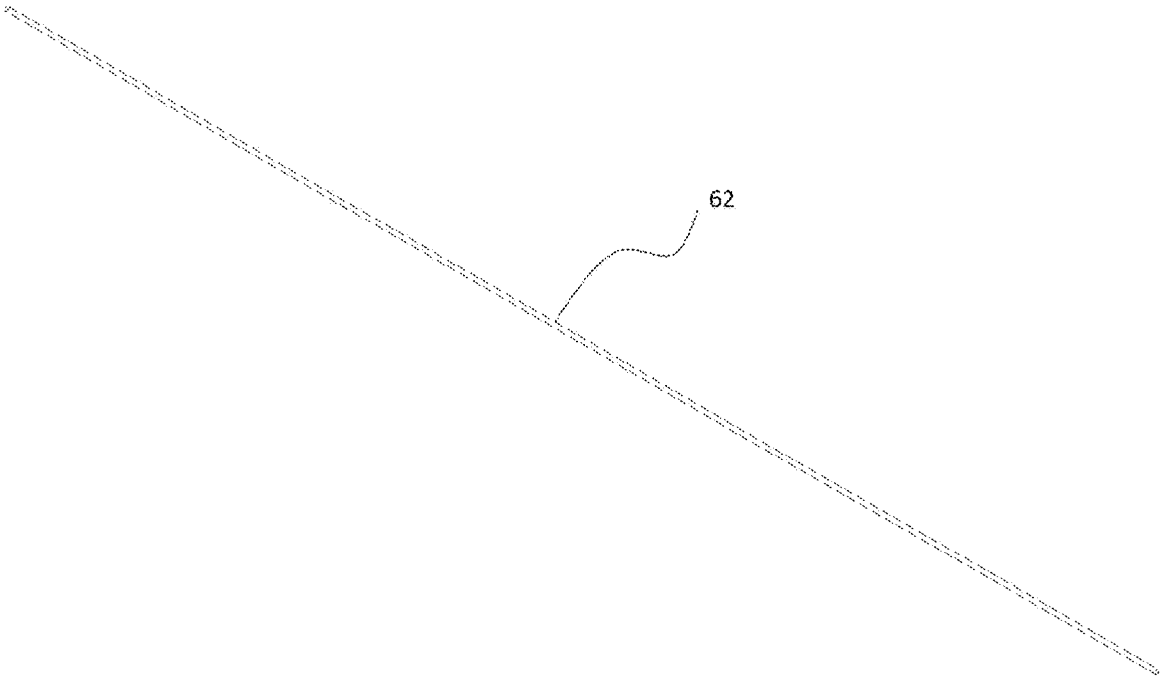
FIG. 7 is a perspective view of a pin, which is disposed between neighboring wall segments of the rollable wall system of FIG. 1.

FIG. 7 is a perspective view of a pin 62, which is disposed inside each hinge between two neighboring wall segments. The shape of pin 62 can be a cylinder or a multi-segment polygon. In the present invention, the hinges are combined with the wall by a special way, and part of the hinges are embedded inside the wall, so that when the wall is fully expanded, there is no gap between the wall segments and the sealing effect is excellent.

Figure 8:
FIG. 8 is a front exploded view of the wall segments of the rollable wall system of FIG. 1.

FIG. 8 is an exploded front view of wall segments 521, 522, 523, 524, 525, and 526, which all have different heights. As mentioned before, when the wall is closed, the side view of the rotating shaft 50 is a polygon. Wall segments 521, 522, 523, 524, 525, 526 are all the wall segment shapes that will appear during the fabrication process when the side view polygon shape of the shaft 50 is hexagonal. The number of wall segment shapes varies depending on the side cross sectional shape of the rotating shaft 50 and how many wall segments there are in total, and the more polygon sides the rotating shaft 50 has, the more types of wall segments heights there are. In the collapsed state (e.g., rolled up or wound up), wall segment 521 is connected to the shaft and is the innermost one of all the wall segments. Wall segment 526 is in the outermost layer of the winding around shaft 50 and has a design that differs significantly from the remaining wall segments due to its connection to the bottom double locking mechanism and sealing mechanism 54. The wall segment 521, being directly connected to the shaft, is in tight contact with the shaft body all the time during the unfolding process until the rollable wall is fully extended, so there is no need to limit its displacement by setting assistant points on its sides.

Figure 9:
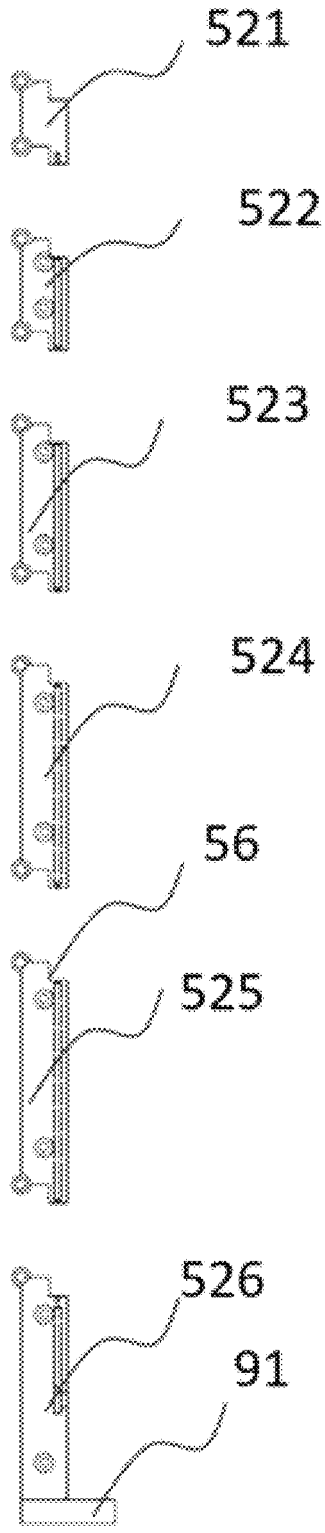
FIG. 9 is a side exploded view of the wall segments of FIG. 8.

FIG. 9 shows a side view of the different wall segments 521, 522, 523, 524, 525, and 526. Due to the different heights of the wall segments 521, 522, 523, 524, 525, and 526, the distance between the two assistant points 70 on the sides of the wall is also different. The largest wall segment has the same edge 56 at the top end as the other wall segments, and a sealing cover 91 at the bottom for fitting with the bottom double locking mechanism and sealing mechanism 54, thus allowing the whole system to achieve a sealing effect.

Figure 10A:
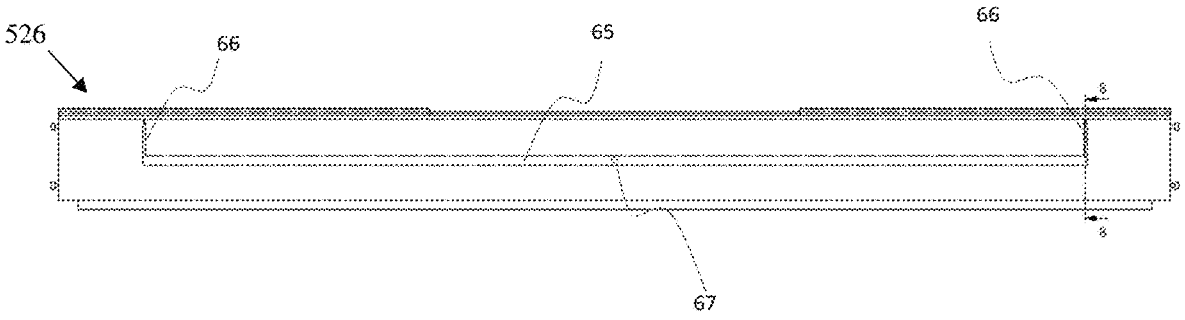
FIG. 10*a* is a front view of the lowermost (e.g., bottom-most) wall segment of the rollable wall system of FIG. 1.
Figure 10B:
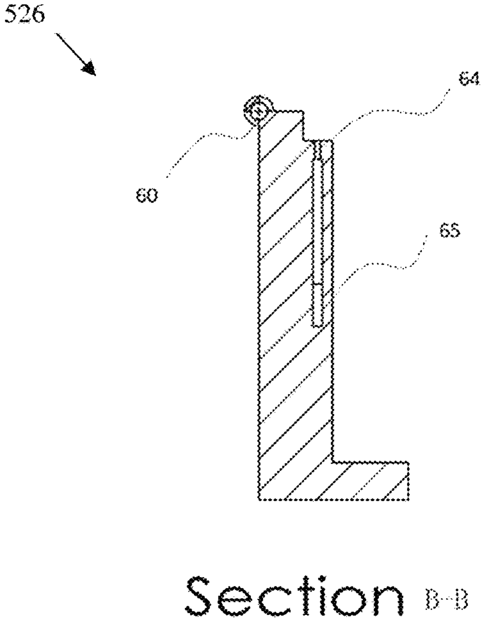
FIG. 10*b* is a side cross-section view of the lowermost wall segment of FIG. 10*a*.

FIG. 10*a* is a front view of the bottommost wall segment 526 with the assemblies for unlocking the interlock between every two neighboring wall segments. Rotating knob 67 mounted on the wall segment 526 is used to drive the long link plate 65 so that the vertical rods on its two sides will be pushed upwards to pop the tenons from the upper wall segment out of the bottommost wall segment. Once the tenons are popped out of the bottommost wall segment, the neighboring wall segment will be unlocked from the bottommost wall segment, and then the two wall segments will only be connected by the hinges between them and are free to rotate relative to each other. FIG. 10*b* is a side cross section view of the bottommost wall segment 526, showing the horizontal long link plate 65, the vertical rods 66, as well as the hinge 60.

Figure 11:
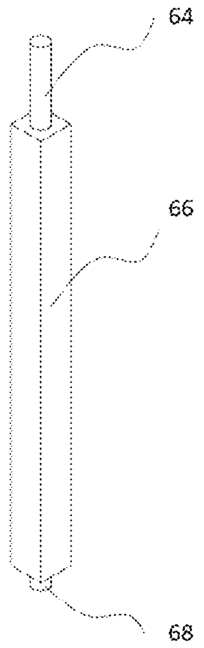
FIG. 11 is a perspective view of a vertical bar, which is part of the unlocking mechanism disposed between neighboring wall segments of the rollable wall system of FIG. 1.

FIG. 11 is a perspective view of the vertical bar that is part of the unlocking mechanism between any two neighboring wall segments. The vertical bar is sized and dimensioned to fit inside holes 63 in each wall segment (see FIG. 5). The bottom circular rod is the tenon part 68 that inserts into the lower neighboring wall segment once the two neighboring wall segments are both in vertical position and are in tight contact with each other. The tenon 68 inserted into the lower neighboring wall segment will prevent the two neighboring wall segments from rotating relative to each other. The middle rectangular segment 66 of the vertical bar has a bigger cross section than the top and bottom segments, which will prevent the whole vertical bar fully going out of this wall segment from top or bottom. The top segment of the vertical bar is called popping head 64, which has a circular cross section and will pop the tenon 68 from the upper wall segment out of this wall segment to disconnect the two neighboring wall segments at the turning of the rotating knob 72.

Figure 12:
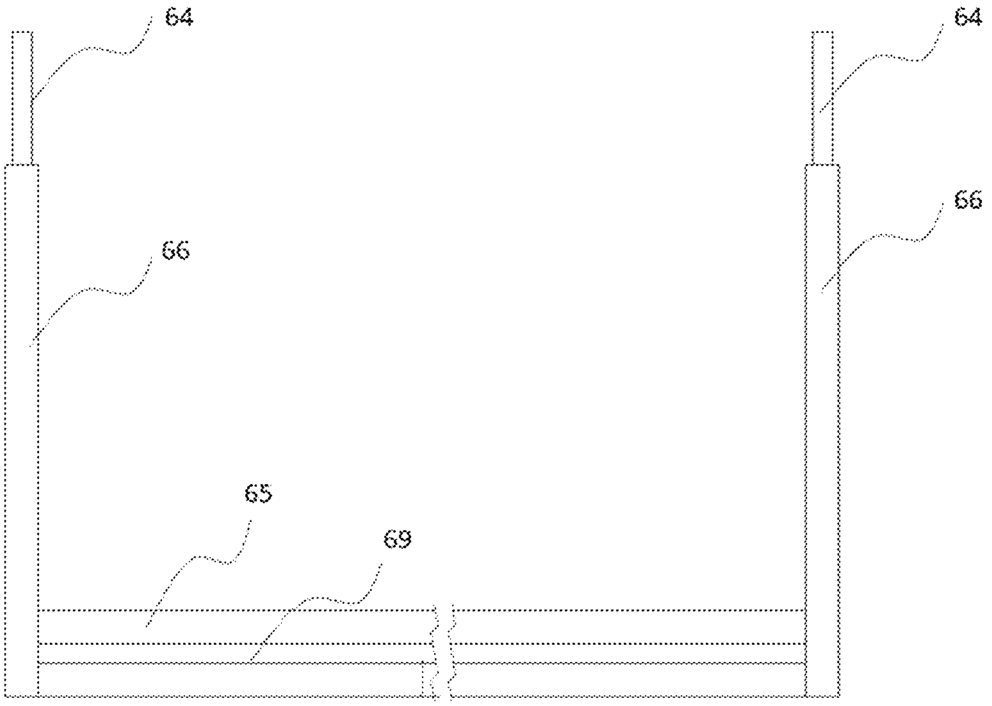
FIG. 12 is a front view of the unlocking mechanism mounted in the lowermost wall segment of the rollable wall system of FIG. 1.

FIG. 12 is a front view of a part of the locking mechanism mounted inside the wall block 526 for locking neighboring wall segments together. The structure of the part consists of two vertical rods 66 and two horizontal long link plates 65. The two long link plates 65 connect the rotating knob 67 and the rotating knob 67 is installed in the slot 69 between the two long link plates 65. The two vertical rods 66 are symmetrical about the center of this part and is used to push the upper latching part to achieve locking and unlocking of the wall segments.

Figure 13:
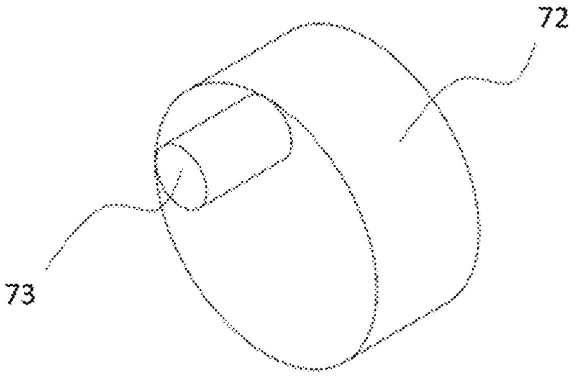
FIG. 13 is a perspective view of a rotating knob of the unlocking mechanism of FIG. 12.

FIG. 13 is a perspective view of the rotating knob 67 for controlling the locking and unlocking mechanism between neighboring wall segments. Knob 67 comprises a knob body 72 and a projecting rod 73 that functions as a handle for rotating knob 67.

Figure 14:
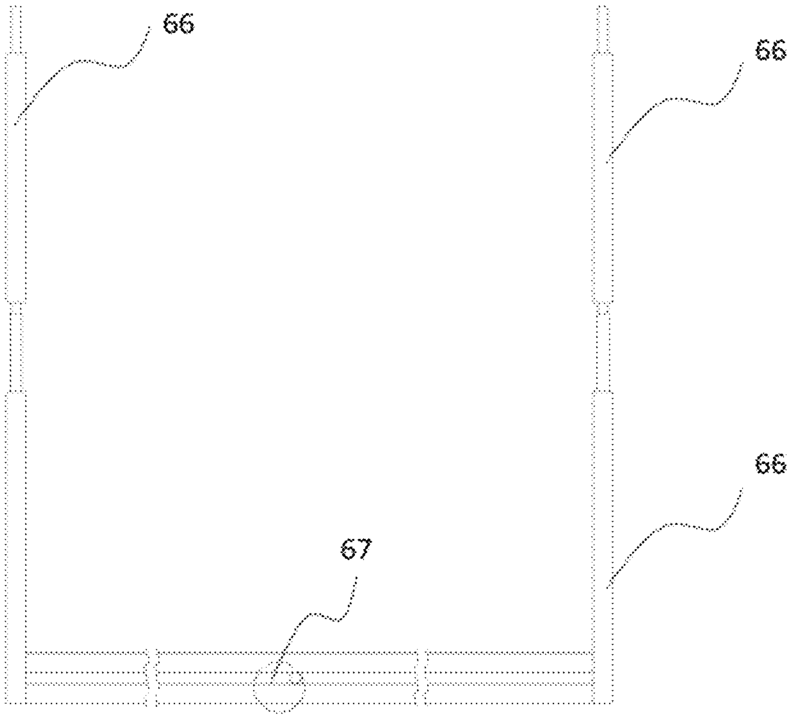
FIG. 14 is a front view of the unlocking mechanism of FIG. 12 with additional vertical bars.

FIG. 14 is an isolated front view of assemblies for the locking and unlocking mechanism between neighboring wall segments, including additional vertical bars 66 and the rotating knob 67. Whenever a lower vertical bar 66 moves upwards, it will push the vertical bar 66 above it and any additional vertical bars 66 above it (not shown) will move upwards by the same distance. Therefore, every tenon 68 will be pushed into the upper wall segment and every wall segment can be connected and fixed with its neighboring wall segments at the same time.

Figure 15:
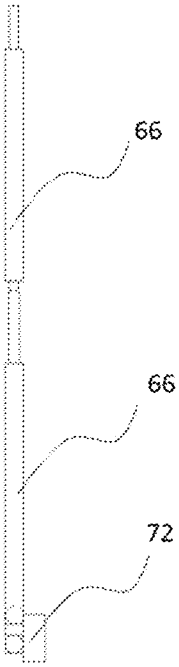
FIG. 15 is a side view of the unlocking mechanism of FIG. 14.

FIG. 15 is an isolated side view of assemblies for the locking and unlocking mechanism between neighboring wall segments, including the vertical bars 66 and the rotating knob 67.

Figure 16:
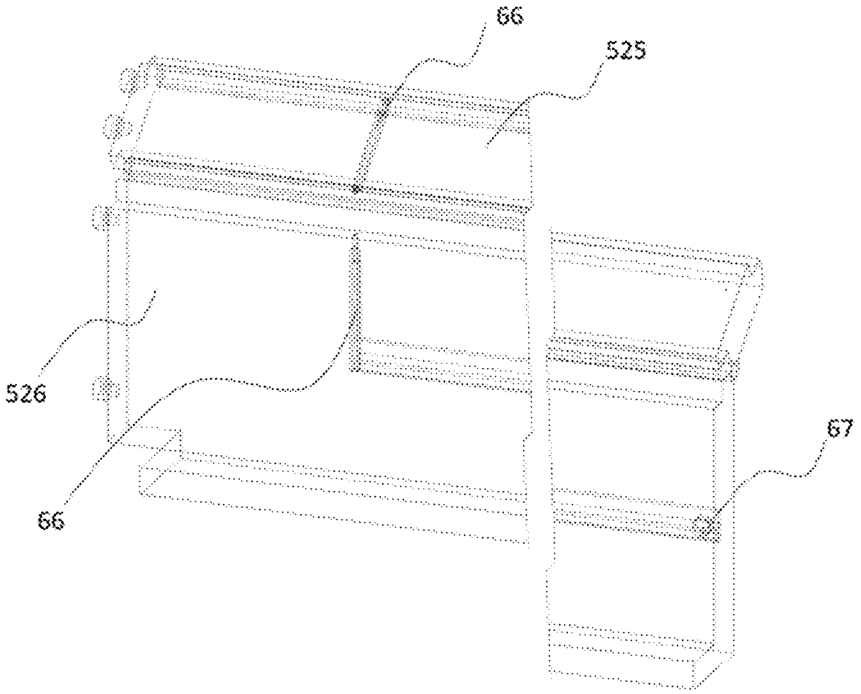
FIG. 16 is a perspective view of the lowermost wall segment and second lowermost wall segment of the rollable wall system of FIG. 1 in an unlocked state.

FIG. 16 is a perspective view of the locking and unlocking assemblies inside wall segments, which are in an unlocked state. The unlocking assembly includes the vertical bars 66, the long link plate 69, and the rotating knob 67. The bottommost wall segment 526 and the upper neighboring wall segment 525 are shown in an unlocked state and they are free to rotate relative to each other. The unlocked state is true for every two neighboring wall segments when knob 67 is rotated to the unlocked position.

Figure 17:
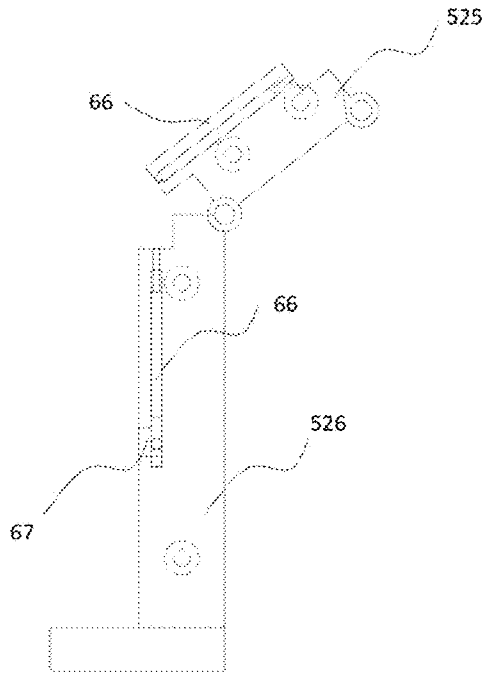
FIG. 17 is a side view of the lowermost wall segment and second lowermost wall segment of FIG. 16.

FIG. 17 is a side view of the locking and unlocking assemblies inside wall segments, which are in an unlocked state. The unlocking assembly includes the vertical bars 66, the long link plate 69, and the rotating knob 67. The bottommost wall segment 526 and the upper neighboring wall segment 525 are shown in an unlocked state and they are free to rotate relative to each other. The unlocked state is true for every two neighboring wall segments when knob 67 is rotated to the unlocked position.

Figure 18:
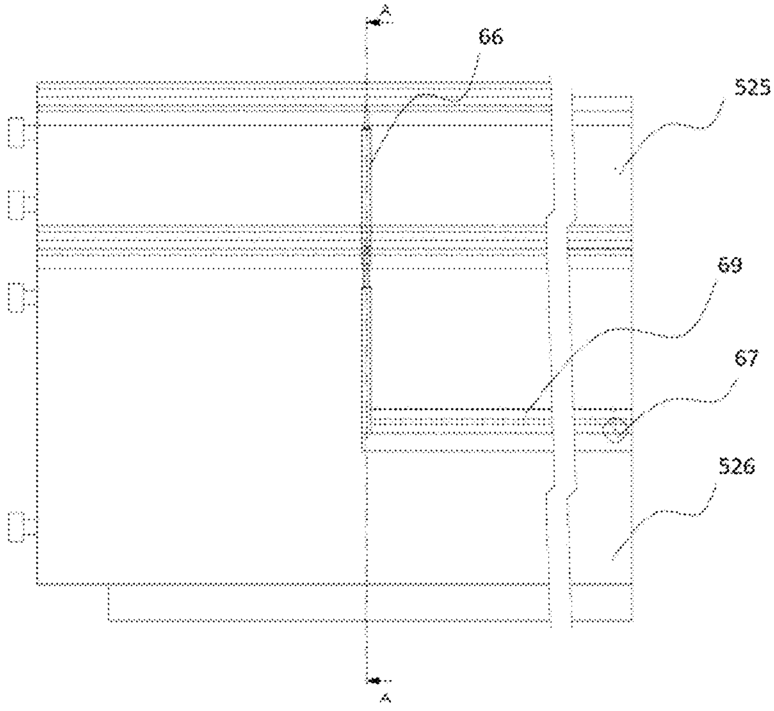
FIG. 18 is a front view of the lowermost wall segment and second lowermost wall segment of FIG. 16 with the unlocking mechanism in the locked stated.

FIG. 18 is a front view of the locking and unlocking assembly inside the wall segments, which are in a locked state. The unlocking assembly includes the vertical bars 66, the long link plate 69, and the rotating knob 67. The bottommost wall segment 526 and the upper neighboring wall segment 525 are shown in a locked state and they are unable to rotate relative to each other. The locked state is true for every two neighboring wall segments when knob 67 is rotated to the locked position. When the two neighboring wall segments lay flat on a same plane, the vertical bar inside the lower wall segment will be pushed into the upper wall segment so that the two neighboring wall segments will be interlocked. This interlocking mechanism, as well as the stepped shape of the top and bottom wall segment edges will not only provide out-of-plane support for both wall segments, but also help realize watertightness, airtightness, and sound insulation.

Figure 19:
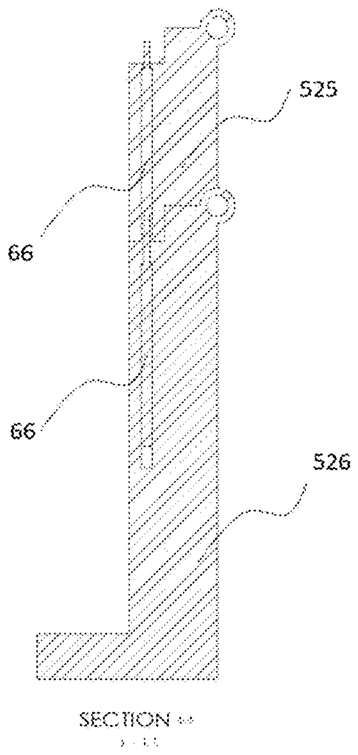
FIG. 19 is a side view of the lowermost wall segment and second lowermost wall segment of FIG. 18.

FIG. 19 is a side cross section view (Section A-A) of the locking and unlocking assembly inside wall segments, which are in a locked state. The unlocking assembly includes the vertical bars 66, the long link plate 69, and the rotating knob 67. The bottommost wall segment 526 and the upper wall segment 525 are shown in a locked state and they are unable to rotate relative to each other. The locked state is true for every two neighboring wall segments when knob 67 is rotated to the locked position.

Figure 20:
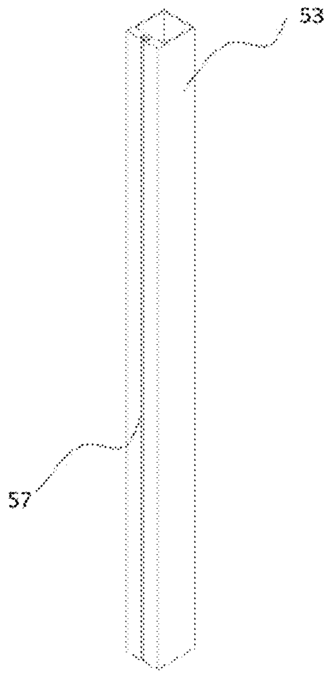
FIG. 20 is a perspective view of the column and guiding rail of the rollable wall system in FIG. 1.

FIG. 20 is a perspective view of the column 53 with guiding rail 57. The main structural part of the column is a steel member with a hollow square section. The guiding rail 57 is a functional part that is welded to the main structural part. The assistant points 70 on the two sides of the wall segments run and slide along this guiding rail 57 when the rollable wall system is being retracted or extended. The column 53 is installed on each side of the rollable wall system and provide support for the rotating shaft 50 above. The polygonal rotating shaft 50 is horizontally movable/translatable so that the wall segment being pulling down is always in line with the guiding rails 57 of the two side columns 53.

Figure 21:
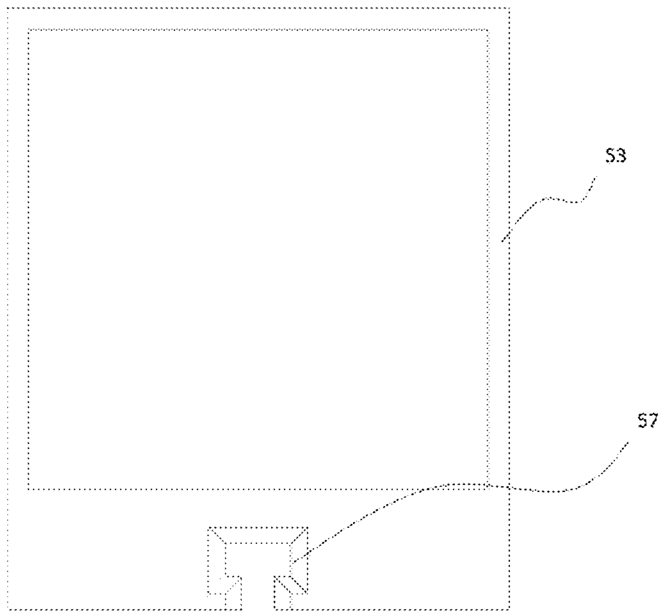
FIG. 21 is a top view of the column and guiding rail of FIG. 20.

FIG. 21 is a top view of the column 53 with guiding rail 57. The main structural part and the guiding rail 57 are presented. The guiding rail 57 is a T-shaped groove, which prevents the assistant points of the wall segments from being detached from the column. The assistant points run along the guiding rail so that the wall segments go up or down smoothly.

Figure 22:
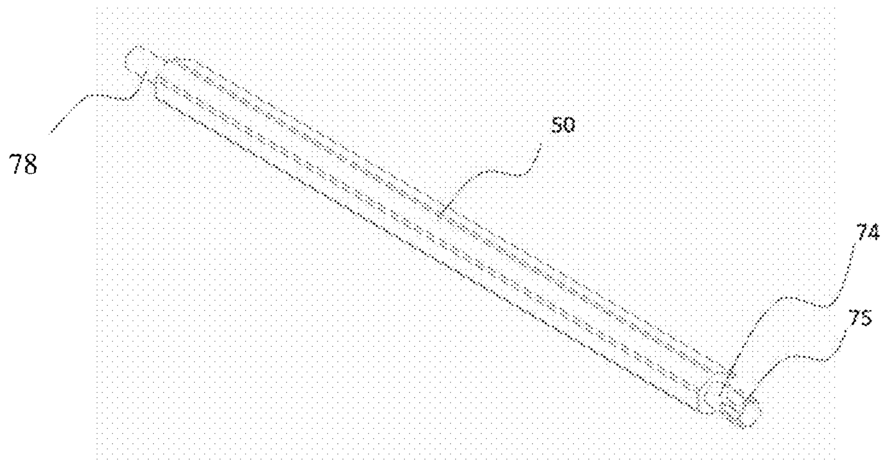
FIG. 22 is a perspective view of the rotating shaft of the rollable wall system of FIG. 1.

FIG. 22 is a perspective view of the rotating shaft 50. All the wall segments will be wound around the rotating shaft after the rollable wall system is rolled up. The shaft 50 has a hollow polygonal section. On the two ends of the rotating shaft 50 are circular handles 74, the diameter of which is smaller than that of the middle polygonal section. On one end of the shaft 50 there are stopper protrusions or inclined teeth sticking out of the circular surface called ratchet 75, which stop the rotating shaft 50 from rotating at angular intervals. This pawl-ratchet mechanism prevents the wall segments from running down suddenly along the guide rails when the wall segments are being retracted and wound back onto the rotating shaft 50. The stopper protrusions or inclined teeth are only steep on one side but are very gently sloped on the other side, which means the pawl can only engage the teeth and stop rotation when the wall segments are retracted (e.g., rolled up) as opposed to extended (e.g., rolled down).

Figure 23:
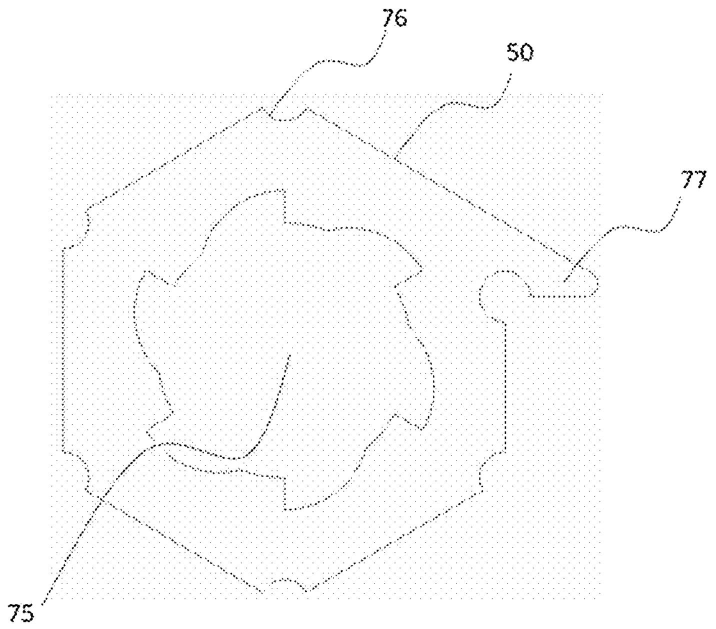
FIG. 23 is a right side view of the rotating shaft of FIG. 22.

FIG. 23 is a right side view of rotating shaft 50. At angular intervals of the polygonal section, there is an arc-shaped groove 76 to accommodate the hinge 55 of connecting wall segments. There is a nearly triangular protrusion 77 sticking out of the nearly polygonal section at the hinge 55 where the topmost wall segment 521 hingeably connects with shaft 50. The detailed cross section shape of the ratchet 75 for engaging a pawl 80 is also illustrated. The teeth of the ratchet 75 are gently sloped in the counterclockwise direction, while have a vertical surface on the clockwise side, which serves as a stopper when engaged with pawl 80.

The rotating shaft 50 has a hollow polygonal middle section and is used for rolling up the entire wall. Two neighboring wall segments can form an angle between 0 degree to 180 degrees via hinges 55. Since the wall is made with hard material, connected segment by segment, it means the wall segment is not able to be deformed. Therefore, the rotating shaft 50 should fit for a discrete surface rolling. The polygonal rotating shaft 50 is designed to serve as the core of the rollable wall system.

The rotating shaft 50 is polygonal, but two sides have been adapted for transiting to a next winding layer. Among the innermost layer of wall segments 521, which are in direct contact with the polygonal shaft 50 when retracted, the first wall segment 521 is reduced in height size so that the last wall segment will be able to transit to the outer layer of wall segments, smoothly with an angle equal to an angle of the polygon. For the first wall segment of the outer layer, it can lay on the first wall segment of the innermost layer and continue to position the connecting hinge on a diagonal line of the polygon.

Figure 24:
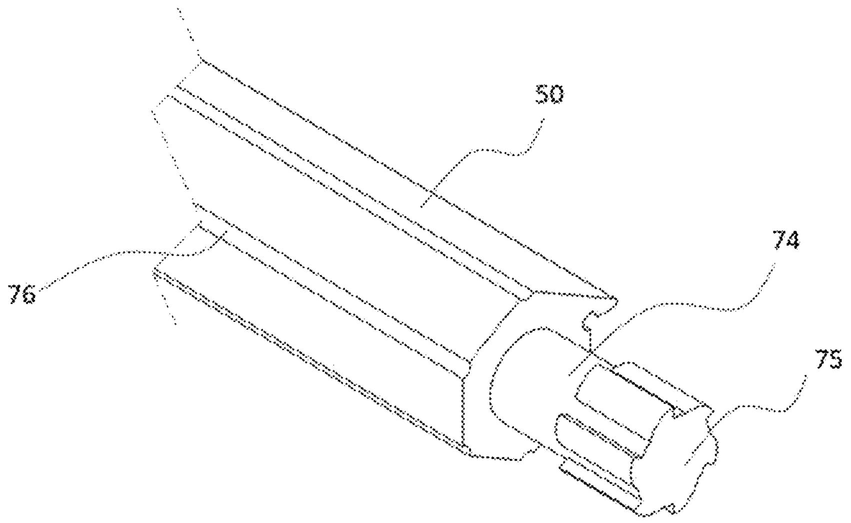
FIG. 24 is a close-up perspective view of the right end of the rotating shaft of FIG. 22.

FIG. 24 is a perspective view of the end of the rotating shaft 50. The polygonal segment, a circular segment 74, and the ratchet 75 are shown.

Figure 25:
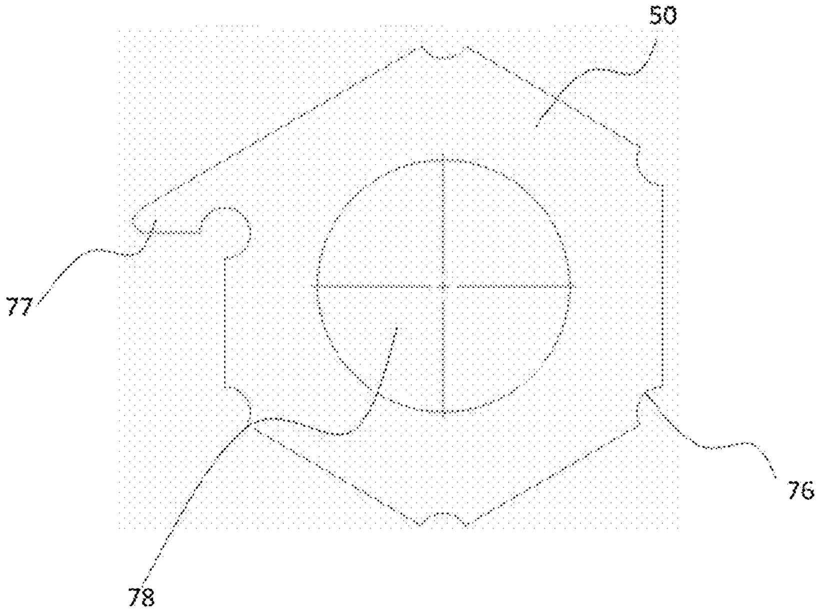
FIG. 25 is a left side view of the rotating shaft of FIG. 22.

FIG. 25 is a left side view of the rotating shaft 50. Presented are the arc-shaped grooves 76 to accommodate the hinge 55 of connecting wall segments. The nearly triangular protrusion 77 sticks out of the nearly polygonal section at the hinge 55. Hinge 55 is where the topmost wall segment 521 hingeably connects with shaft 50. The circular end handle 78 is also shown.

Figure 26:
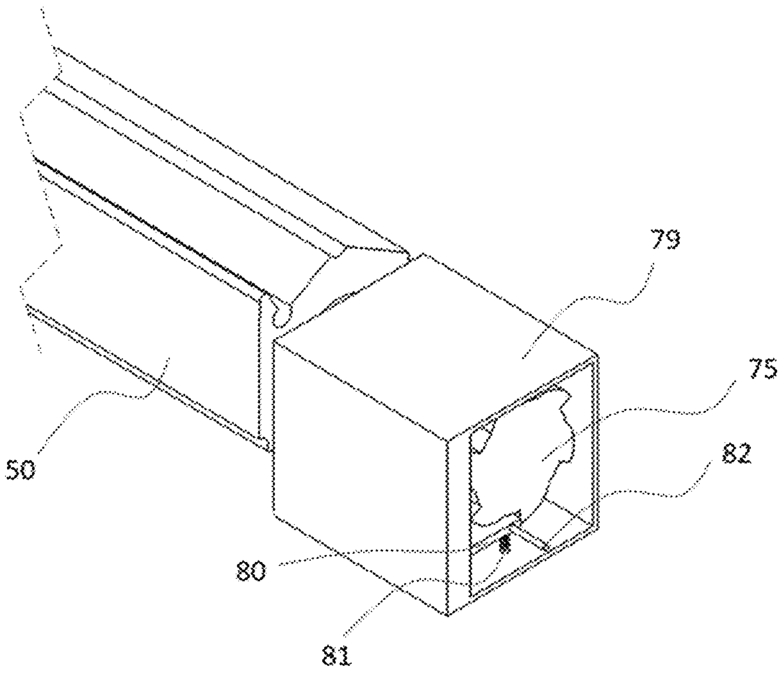
FIG. 26 is a perspective view of the rotating shaft, ratchet-pawl system, and box cover of the rollable wall system of FIG. 1.

FIG. 26 is a perspective view of the rotating shaft 50 with an end box 79 containing the pawl-ratchet mechanism. There is a pawl 80 that goes against the vertical surfaces of the teeth of ratchet 75, which stops the rotating shaft 50 from further rotating. The pawl-ratchet mechanism is placed so that after the rotating shaft 50 rotates for every certain number of degrees, a tooth of the ratchet 75 will be stopped by the pawl 80 since there is a vertical spring 81 under the pawl 80 that keep pushing the pawl 80 as high as possible. In order to have the rotating shaft 50 continue to rotate, a small circular handle 82 sticking out from the side of the pawl 80 needs to be pulled down. Once the pawl 80 is released, rotation of the rotation shaft 50 will be stopped again when the pawl 80 meets the next tooth of the ratchet on the end handle. When the rotating shaft 50 is rotated in the opposite direction, pawl 80 passes over the gentle slope of the teeth to allow for uninterrupted rotation.

Figure 27:
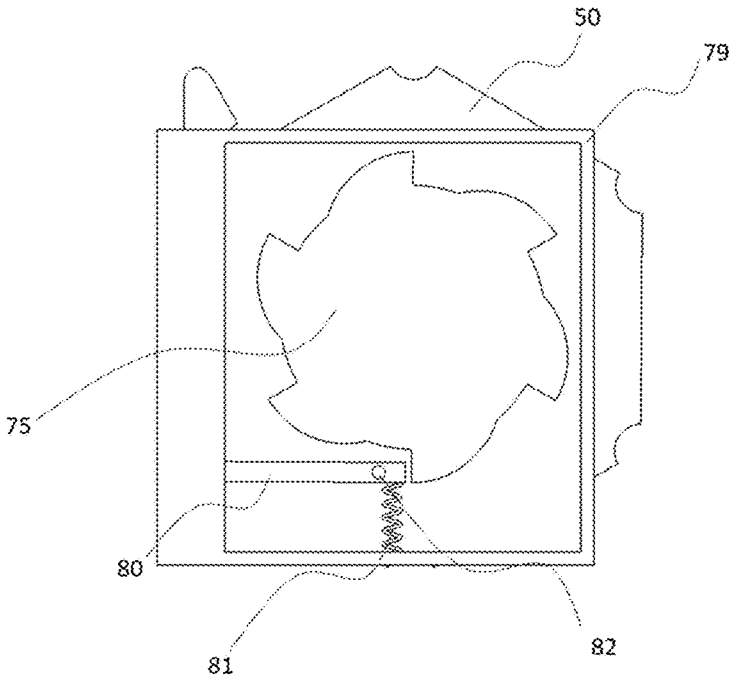
FIG. 27 is a side cross section view of the rotating shaft and ratchet-pawl system of FIG. 26 in a locked state.

FIG. 27 is a side cross section view of the handle 82 and the pawl-ratchet mechanism, which contains the end containing box 79, the pawl 80 and the spring 81. The pawl 80 is hinged to the end containing box 79 and is free to rotate downwards on the side near the spring 81 below.

Figure 28:
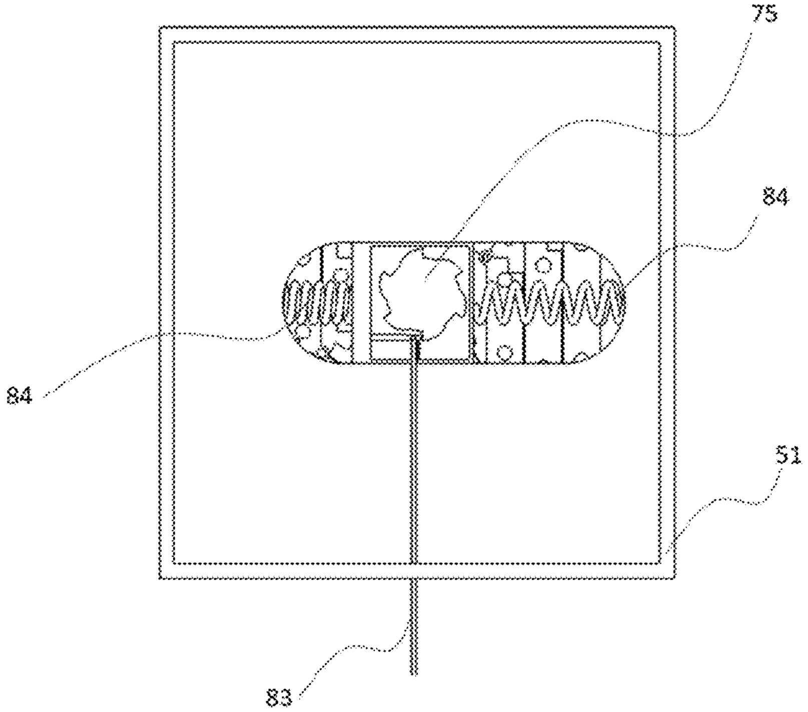
FIG. 28 is a side view of the rotating shaft, ratchet-pawl system, and box cover of FIG. 26 in a locked state.

FIG. 28 is a side cross section view of the handle 82 and the pawl-ratchet mechanism, including pawl 80, the rope 83 for pulling down the pawl 80, the two horizontal springs 84 for restoring the position of the rotating shaft 50, and the optional box 51 for containing the collapsed wall segments wound around the rotating shaft 50. If a user would like to roll down the wall manually, the rope 83 for controlling the pawl 80 can be pulled down periodically so that the wall segments can fall down step by step in a controllable fashion and will not fall to the ground suddenly. During the process of rolling the wall segments up or down, the rotating shaft 50 needs to move horizontally so that the next wall segment can be positioned correctly and enter the guiding rails 57 of the columns 53 and the guiding rails 71 of box 51.

Figure 29:
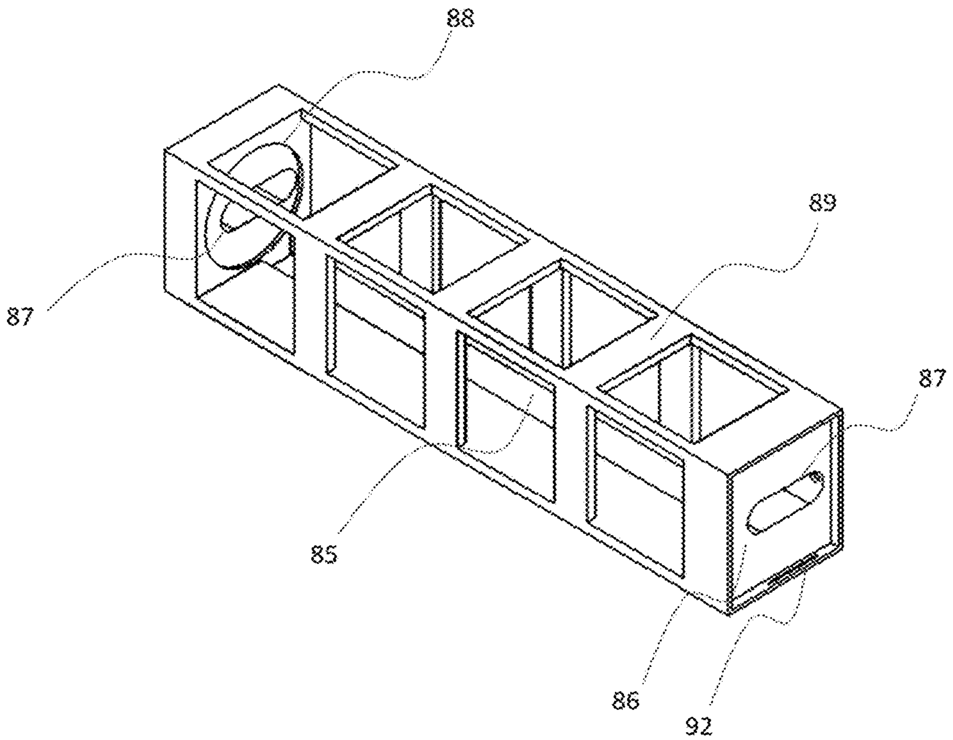
FIG. 29 is a perspective view of the frame box of the rollable wall system of FIG. 1.

FIG. 29 is a perspective view of the optional box 51 for containing the retracted wall segments. This box 51 is composed of the bottom plate 85, end plates 86 with long slot holes 87 for the rotating shaft 50, a circular recess 88 on the end plate for avoiding the assistant points 70 on the sides of the retracted wall segments, and the side plates for strengthening the box. A slit 92 on the bottom plate of the optional containing box 51 allows the rope 83 to pass through.

Figure 30A:
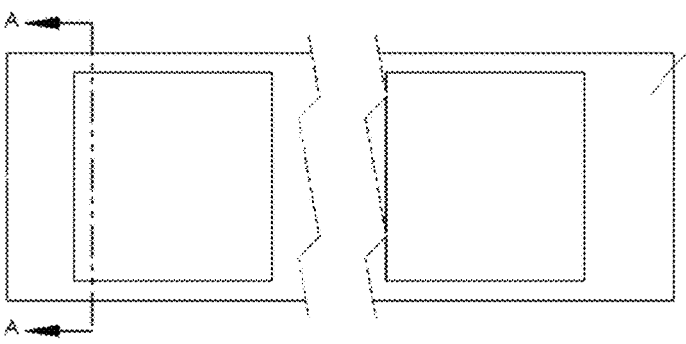
FIG. 30*a* is a front view of the frame box of FIG. 29.
Figure 30B:
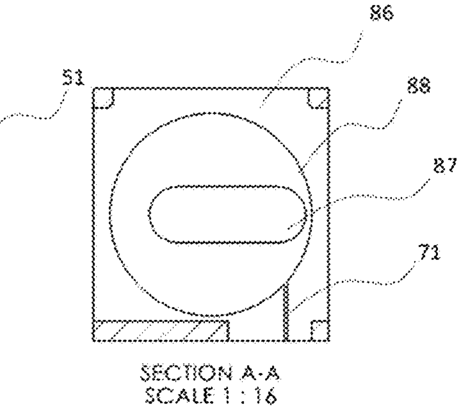
FIG. 30*b* is a side cross section view of the frame box of FIG. 29.
Figure 30C:
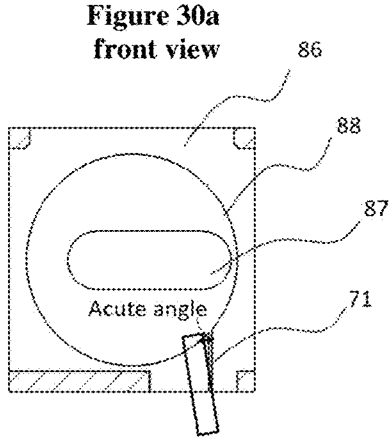
FIG. 30*c* is a side cross section view of the frame box of FIG. 29 showing the wall segment at an acute angle with guiding rail 71.
Figure 30D:
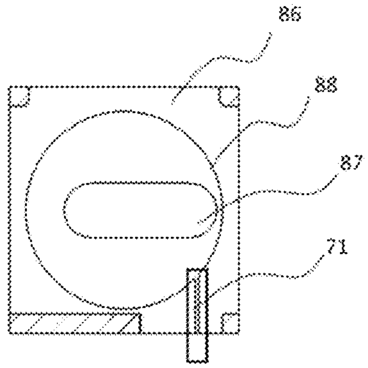
FIG. 30*d* is a side cross section view of the frame box of FIG. 29 showing the wall segment vertically aligned with guiding rail 71.

FIG. 30*a* is a front view of the optional box 51 for containing the retracted wall segments and FIG. 30*b* is a side cross section view of the optional box 51 to give a picture of the guiding rail 71 in box 51. When the wall is rolling down, the guiding rail 71 guides the assistant points 70 of the wall segments into the guiding rails 57 of the columns 53 in a vertically aligned manner as shown in FIG. 30*d* rather than at an acute angle as shown in FIG. 30*c*.

Figure 31:
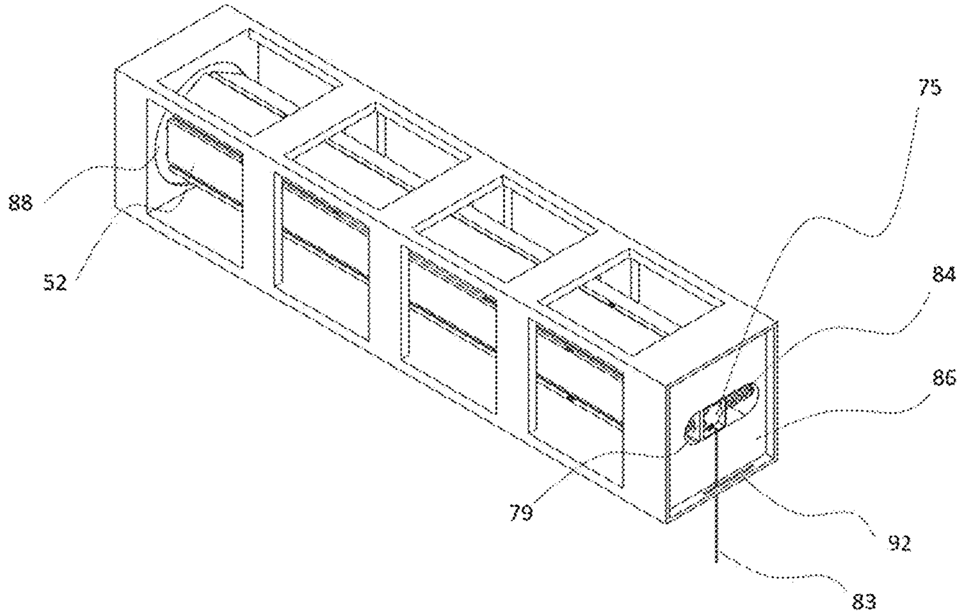
FIG. 31 is a perspective view of the frame box and rotating shaft of the rollable wall system of FIG. 1.

FIG. 31 is a perspective view of the optional box 51 containing the retracted wall segments. The end plate 86 of the optional containing box 51 and the retracted wall segment 52 are presented. The handle 82 of the pawl-ratchet mechanism is part of the stopping mechanism for preventing the rollable wall segments 52 from falling to the ground suddenly. The end box 79 contains handle 82 and provides support for the pawl 80 and the two horizontal springs 84, which function to restore shaft 50 to its correct horizontal position. The circular recess 88 is provided to avoid interference with the assistant points 70 on the side of the retracted wall segments. The rope 83 attached to the handle 82 of the pawl 80 can be pulled down so that the pawl 80 will get out of the way of the stopper protrusion or inclined tooth and then the rollable wall system can continue to roll down. A slit 92 on the bottom plate of the optional containing box 51 allows the rope 83 to pass through.

Figure 32:
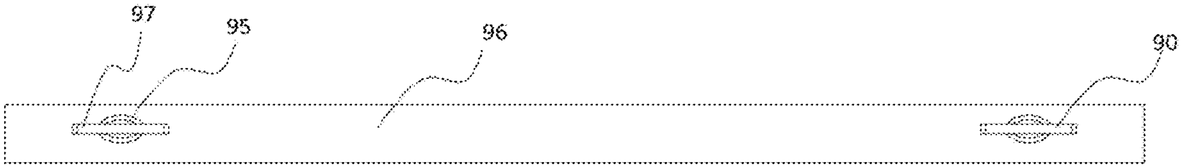
FIG. 32 is a front view of a bottom double locking mechanism that locks with the lowermost wall segment of the rollable wall system of FIG. 1.

FIG. 32 is a front view of the bottom double locking and unlocking mechanism. Two horizontal rectangular pull rings 97 are at the front side of the sill beam 96, which will go into the grooves on the sill beam.

FIG. 33*a* is a top view of the sill beam 96 and FIG. 33*b* is a side cross section view of the latch assembly 99. Once the lowermost wall segment is in tight contact with the sill beam 96, it will automatically be locked by the latching assembly 99 embedded in the sill beam 96. Two horizontal rectangular pull rings 97 are on a side of the sill beam 96. There is a recess 98 on the side surface of the sill beam 96 inside every rectangular pull ring 97. Such recess provides more room inside the rings 97 for a user's hand to pass through and grab the pull ring 97. The latch assembly 99 inside the sill beam 96 is attached to the pull ring 97. When the pull rings 97 are pulled out, the latch assembly 99 is released, and the lowermost wall segment 526 is free to leave the sill beam 96. There is a rectangular groove 100 on top of the sill beam 96, which is for receiving the lowermost wall segment 526 to realize airtightness, watertightness, and structural robustness.

FIG. 34 is a perspective view of the lowermost wall segment 526 and the sill beam 96. The two horizontal rectangular pull rings 97 on a side of the sill beam 96 and a rectangular groove 100 on top of the sill beam 96 are shown. Groove 100 is sized and dimensioned to receive a bottom edge of the lowermost wall segment 526. When the rollable wall system is fully extended, the lowermost wall segment 526 will be locked into the long rectangular groove 100 on the top of the sill beam 96 to realize airtightness, watertightness, and structural robustness. The sealing cover 91 at the bottom edge of the lowermost wall segment 526 can be encased with vulcanizing rubber (or elastomer), and the groove 100 on the top the sill beam 96 can be embedded with molded compressed fiber gasket to help seal the interface between the bottom surface of the wall and the groove 100 of the sill beam 96. A compressed fiber gasket can be used to withstand high compressive loads from the wall. The sill beam 96 can be connected to the columns 53 with high-strength bolts and can be connected to the foundation elements like a grade beam or a wall footing with Hilti anchor bolts.

Figure 35:
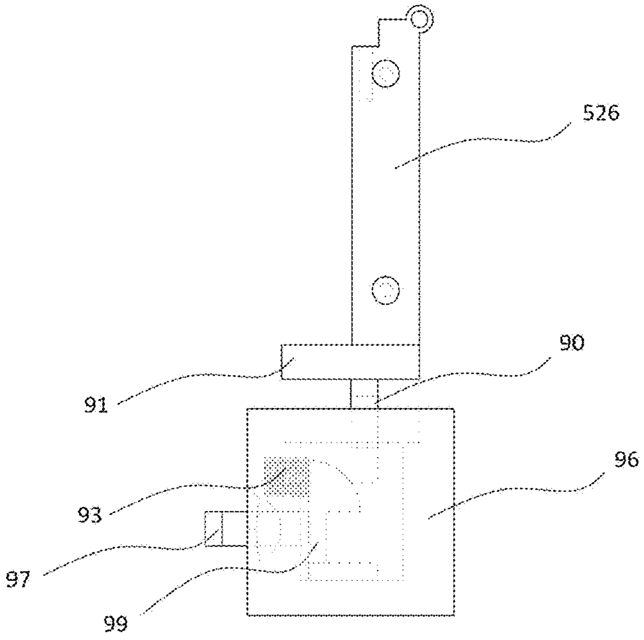
FIG. 35 is a side view of the bottom double locking mechanism and lowermost wall segment of FIG. 34.

FIG. 35 is a side view of the lowermost wall segment 526 and the sill beam 96 in an unlatched state (e.g., unlocked state). The bottom plate and sealing cover 91 of the lowermost wall segment 526 matches the shape of the rectangular groove 100 on top of the sill beam 96. A user's hands can grab the bottom pull rings 97 of the lowermost wall segment 526 to pull the wall segments down. The purpose of spring 93 is to limit the position of the latch assembly 99. In the unlocked state, the spring 93 holds the latch open. Each latch has two springs.

Figure 36:
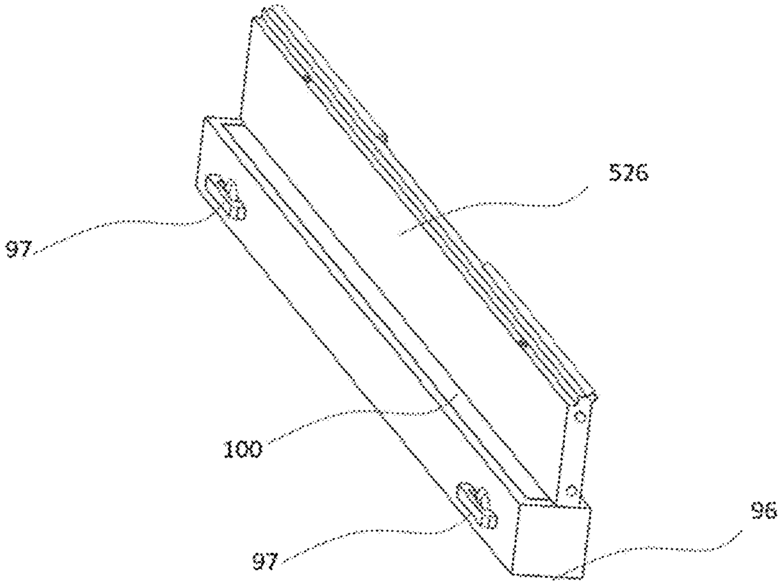
FIG. 36 is a perspective view of the bottom double locking mechanism and lowermost wall segment of the rollable wall system of FIG. 1 in a locked state.

FIG. 36 is a perspective view of the lowermost wall segment 526 locked into the sill beam 96 (e.g., latched state or locked state). The purpose of the bottom double locking mechanism and sealing mechanism is to seal and fix the bottom of the rollable wall to ensure the bottom is watertight, soundproof, and windproof. This bottom lock system is optional and can be replaced by other structure with similar functionalities. The bottom lock system can be divided into three parts, which include a rectangular groove 100 for sealing and two lock structures. The rectangular groove 100 isolates the inner lock in order to keep the interior clean and to ensure that the bottom of the wall will not be exposed to the air, thus providing sound insulation. The lock structure has a latch assembly 99, a horizontal pull ring 97 and two springs 93. When the wall is fully extended, the bottommost wall segment plugs directly into the sill beam 96 and the wall segment will be automatically locked because of the springs 93 and the circular surface on the top of the latch assembly 99.

Figure 37:
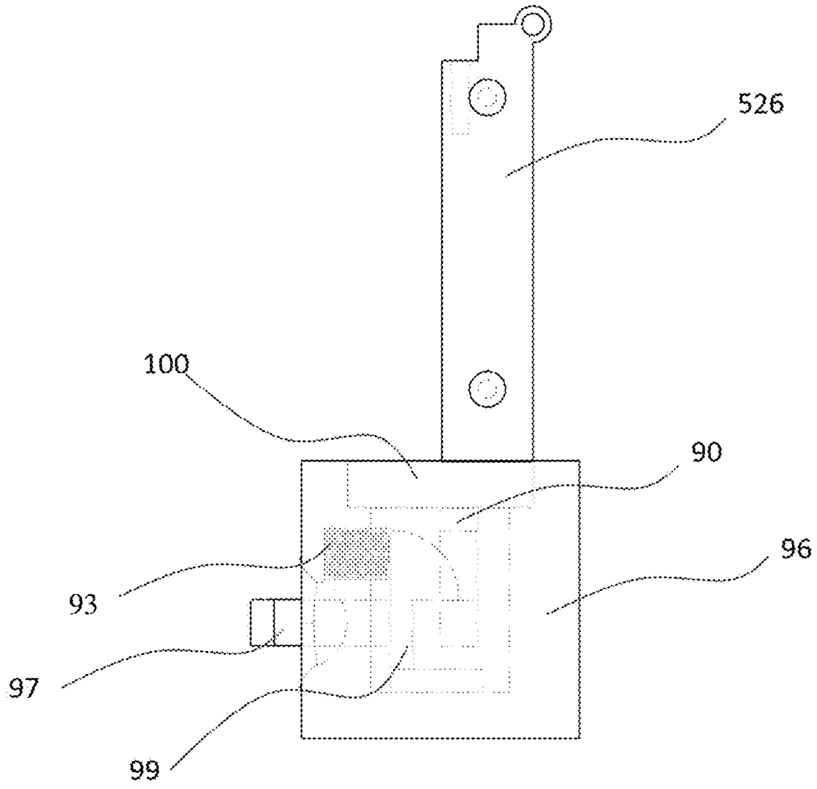
FIG. 37 is a side view of the bottom double locking mechanism and lowermost wall segment of FIG. 36.

FIG. 37 is a side view of the lowermost wall segment 526 locked into the sill beam 96 (e.g., latched state or locked state). During the entry of the vertical pull rings 90 into the sill beam 96, the latch assembly tooth 99 is pushed by the vertical pull rings 90 due to the curved profile of the latch tooth 99 and compresses the horizontal spring 93. When the vertical pull rings 90 enter into the sill beam 96, the latch assembly 99 inside the sill beam 96 will be pushed back by the horizontal spring 93 and the tooth of the latch 99 assembly will go inside the vertical pull ring 90 to obstruct it from going out of the sill beam 96. The horizontal pull ring 97 attached to the latch assembly 99 sticks out of the sill beam 96 from its one side. When the horizontal pull rings 97 are pulled outwards from outside of the sill beam 96, the latch assembly 99 moves with the pull rings and its tooth comes out of the vertical pull ring 90 of the lowermost wall segment 526, and then the lowest wall segment 526 will be free to move upwards and leave the sill beam 96.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the amended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification refers to at least one of something selected from the group consisting of A, B, C . . . and N, the text should be interpreted as requiring only one element from the group, not A plus N, or B plus N, etc.

What is claimed is:

1. A rollable wall system that transitions between an expanded state and a retracted state, comprising:
- a first side column having a first rail;
- a second side column having a second rail;
- a plurality of hingeably connected segments slidably disposed in the first rail and second rail;
- a rotatable shaft hingeably connected with an uppermost segment of the plurality of hingeably connected segments;
- wherein the plurality of hingeably connected segments includes (i) a first subset of segments that form a first winding around the rotatable shaft when in the retracted state, and (ii) a second subset of segments that form a second winding around the first subset of segments when in the retracted state;
- wherein the first subset of segments have a first height and the second subset of segments have a second height that is longer than the first height;
- wherein the first winding and the second winding are configured to be in tight contact when in the retracted state; and
- wherein each of the plurality of hingeably connected segments has a planar surface and the planar surfaces of the connected segments lay flat on a same plane to form a planar surface when in the expanded state.

2. The wall system of claim 1, wherein the shaft has a polygonal cross section.

3. The wall system of claim 2, wherein the polygonal cross section has a triangular protrusion that hingeably connects with the uppermost segment.

4. The wall system of claim 1, further comprising a motor functionally coupled with the rotatable shaft.

5. The wall system of claim 1, wherein the rotatable shaft is disposed inside a frame.

6. The wall system of claim 5, wherein an end of the shaft has a plurality of teeth that mate with a pawl-ratch mechanism of the frame.

7. The wall system of claim 1, wherein a lowermost segment of the plurality of hingeably connected segments comprises a locking and sealing mechanism.

8. The wall system of claim 1, wherein the plurality of hingeably connected segments having mating adjacent edges.

9. The wall system of claim 1, wherein the mating adjacent edges comprise a nesting stepped configuration.

10. The wall system of claim 1, wherein the plurality of hingeably connected segments can rotate between 0 and 180 degrees relative to an adjacent segment of the plurality of segments.

11. The wall system of claim 1, wherein, in the retracted state, the plurality of hingeably connected segments are configured to be in tight contact with an outer surface of the rotatable shaft.

12. The wall system of claim 1, wherein each of the segments comprises a plurality of layers.

13. The wall system of claim 12, wherein the plurality of layers includes at least one of a fireproof layer, a waterproof layer, a soundproof layer, and a structural layer.

14. A rollable wall system that transitions between an expanded state and a retracted state, comprising:
- a rotatable polygonal shaft;
- a plurality of wall segments that are hingeably connected with one another and with the rotatable polygonal shaft;
- wherein the plurality of wall segments each have a planar surface and the planar surfaces of connected segments lay flat on a same plane to form a planar surface when in the expanded state;
- wherein the plurality of wall segments includes a first subset of wall segments that form a first winding around the rotatable polygonal shaft when in the retracted state;
- wherein the plurality of wall segments includes a second subset of wall segments that form a second winding around the first subset of wall segments when in the retracted state;
- wherein the first subset of wall segments each have a first height, and the first winding is configured to be in tight contact with a surface of the rotatable polygonal shaft when in the retracted state; and
- wherein the second subset of wall segments each have a second height that is different than the first height, and the second winding is configured to be in tight contact with a surface of the first winding when in the retracted state.

15. The rollable wall system of claim 14, wherein the plurality of wall segments includes a third subset of wall segments that form a third winding around the second subset of wall segments when in the retracted state.

16. The rollable wall system of claim 15, wherein the third subset of wall segments each have a third height, and the third winding is configured to be in tight contact with a surface of the second winding when in the retracted state.

17. The rollable wall system of claim 14, wherein the number of wall segments in the first subset of wall segments is equal to the number of sides of the rotatable polygonal shaft.

18. The rollable wall system of claim 14, wherein the rotatable polygonal shaft has a hexagonal cross section.

19. A rollable wall system that transitions between an expanded state and a retracted state, comprising:
- a plurality of hingeably connected wall segments including an uppermost wall segment and a lowermost wall segment;
- a rotatable shaft hingeably connected with the uppermost wall segment; and
- an interlocking mechanism comprising (i) a plurality of vertical bars, each of the bars being slidably disposed across a pair of adjacent segments of the hingeably connected wall segments and (ii) a rotating handle operable to transition the vertical bars between a locked position and an unlocked position; and
- wherein, when the vertical bars are in the locked position and the rollable wall system is in the expanded state, the vertical bars provide out-of-plane bending resistance and impede the plurality of wall segments from rotating out of plane from each other; and
- wherein, when the vertical bars are in the unlocked position, the rollable wall system can transition from the expanded state to the retracted state.

* * * * *